United States Patent
Yamaguchi

[11] Patent Number: 6,061,531
[45] Date of Patent: *May 9, 2000

[54] ONE-TIME USE CAMERA WITH STROBE CIRCUIT BASEBOARD

[75] Inventor: Hiroshi Yamaguchi, Hino, Japan

[73] Assignee: Konica Corporation, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/920,453

[22] Filed: Aug. 29, 1997

[30] Foreign Application Priority Data

Sep. 26, 1996 [JP] Japan ................................. 8-254665

[51] Int. Cl.[7] .................................................. G03B 17/02
[52] U.S. Cl. .............................. 396/535; 396/542; 396/6
[58] Field of Search ............................. 396/6, 176, 177, 396/178, 205, 206, 535, 547

[56] References Cited

U.S. PATENT DOCUMENTS 5,550,607  8/1996  Mizoguchi .
5,692,221  11/1997  Tobioka et al. ............................... 396/6
5,752,084  5/1998  Motomura et al. ........................... 396/6

OTHER PUBLICATIONS

European Search Report EP 97 30 6675 with Annex, Dec. 2, 1997.
EPO—Patent Abstracts of Japan, Publication #08136990, Publication date: May 31, 1996.
EPO—Patent Abstracts of Japan, Publication #63237045, Publication date: Oct. 3, 1988.
EPO—Patent Abstracts of Japan, Publication #02166432, Publication date: Jun. 27, 1990.

Primary Examiner—Howard B. Blankenship
Attorney, Agent, or Firm—Jordan B. Bierman; Bierman, Muserlian and Lucas

[57] ABSTRACT

A one-time use camera having a strobe unit and performing stroboscopic photographing by causing a xenon discharge tube to emit light. The camera includes a film roll chamber for accommodating a photographic film and the strobe unit. The strobe unit further includes a pair of strobe circuit base boards, arranged on both sides of a front surface of the film roll chamber of the one-time use camera, for driving the xenon discharge tube and a connecting member for electrically connecting the strobe circuit base boards with each other.

13 Claims, 5 Drawing Sheets

ONE-TIME USE CAMERA WITH STROBE CIRCUIT BASEBOARD

BACKGROUND OF THE INVENTION

The present invention relates to a one-time use camera, and more specifically, to a one-time use camera equipped with a strobe.

A one-time use camera needs, due to its peculiarity, to be reduced in its cost and thereby to be offered to users at a low price. It is also demanded by users that the one-time use camera is made small to the utmost.

However, in the case of a one-time use camera equipped with a strobe, a strobe circuit base board used in the one-time use camera forms a strobe unit employing a sheet of circuit board having an area that is relatively large for a one-time use camera and having thereon various expensive electronic parts soldered on the circuit board.

In a one-time use camera equipped with a strobe, therefore, a strobe unit occupies a large part of cost and space of the one-time use camera.

Accordingly, in a one-time use camera equipped with a strobe, cost reduction for a strobe unit which occupies a large portion of cost and miniaturization of the strobe unit which occupies a large portion of space have a great influence on cost reduction and miniaturization of the one-time use camera, and achievement thereof has a great effect.

Therefore, cost reduction and miniaturization of a strobe unit have the important key to an offer of an inexpensive and small-sized one-time use camera to users.

SUMMARY OF THE INVENTION

The present invention has been achieved to solve the problems mentioned above. Namely, an object of the invention is to provide an inexpensive and small-sized one-time use camera to users.

The object of the invention can be attained by taking the following structures.

Namely, a one-time use camera having therein a strobe unit and being capable of performing stroboscopic photographing by causing a xenon discharge tube to emit light, wherein a strobe unit is of the structure in which two strobe circuit base boards are arranged on both sides of a front surface of a film roll chamber of the one-time use camera.

Further, the one-time use camera having therein a strobe unit and being capable of performing stroboscopic photographing by causing a xenon discharge tube to emit light, wherein the above-mentioned strobe unit is one in which two strobe circuit base boards are connected and fixed by one or plural sheet metal members.

Further, the one-time use camera having therein a strobe circuit and being capable of performing stroboscopic photographing by causing a xenon discharge tube to emit light, wherein there is provided a strobe circuit base board in which an oscillating transformer whose terminals are arranged in the direction that is in parallel with the strobe circuit base board is implanted and fixed in an opening in the strobe circuit base board that is larger than the oscillating transformer.

Further, a one-time use camera having therein a strobe circuit and being capable of performing stroboscopic photographing by causing a xenon discharge tube to emit light, wherein a projected portion is provided on a trigger switch for the strobe circuit and a recessed portion is provided on the main body or a front cover of the one-time use camera which faces the trigger switch, and the projected portion on the trigger switch is engaged with the recessed portion to be incorporated when assembling the one-time use camera.

BRIEF DESCRIPTION OF THE DRAWINGS

FIGS. 4(a)–4(c) represent diagrams of a strobe unit of the invention, wherein

DETAILED DESCRIPTION OF THE INVENTION

Next, the invention will be explained in detail as follows, referring to FIGS. 1–5. First, an example of an outline of a one-time use camera used in the invention will be explained, referring to FIGS. 1 and 2.

Figure 1:
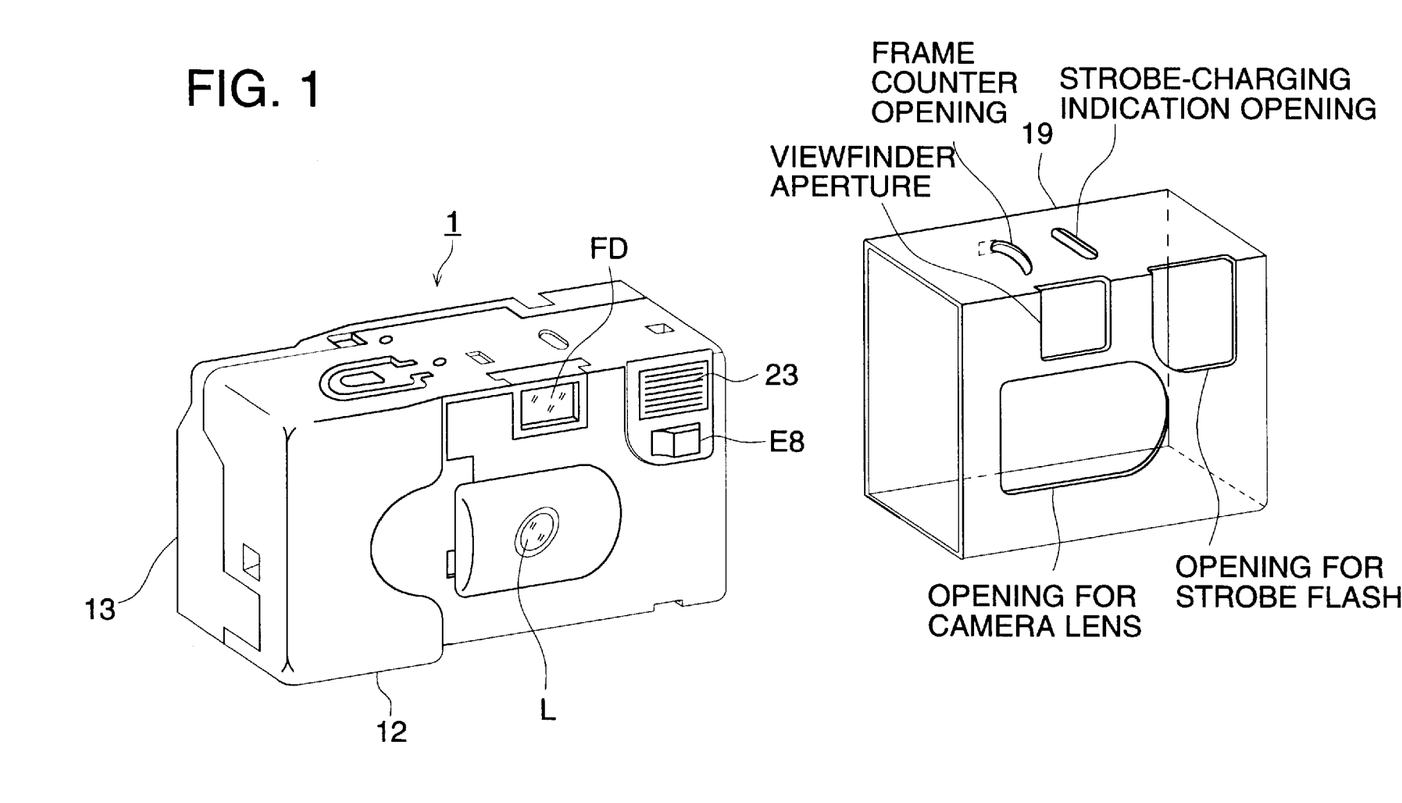
FIG. 1 is a perspective view on the front side of a one-time use camera.
Figure 2:
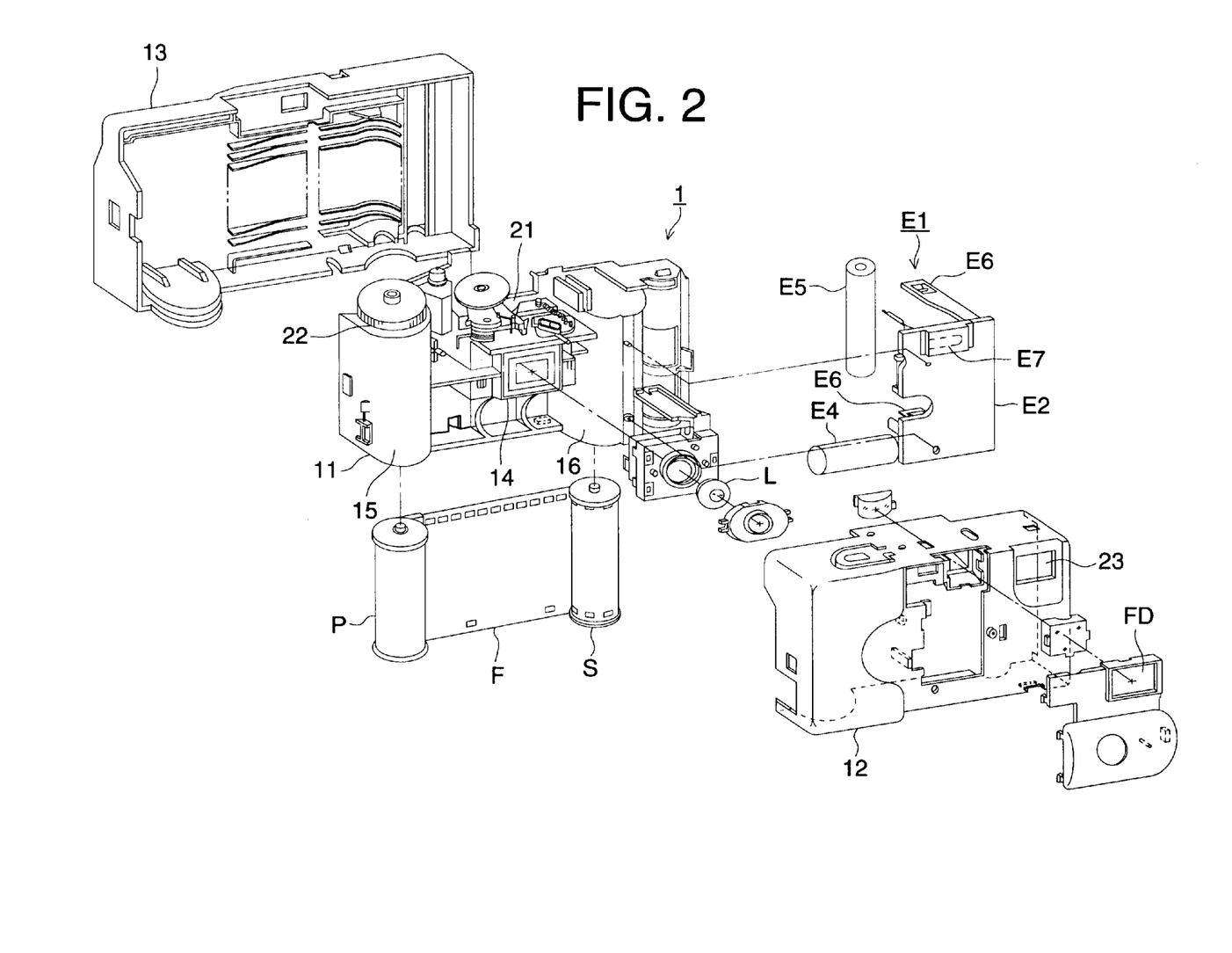
FIG. 2 is an exploded perspective view illustrating an outline of the inside of a one-time use camera.

FIG. 1 is a perspective view on the front side of a one-time use camera, and it also shows cover members which cover the one-time use camera. FIG. 2 is an exploded perspective view illustrating an outline of the inside of the one-time use camera.

The present one-time use camera is a simple camera unit which holds therein a photographic film (hereinafter referred to as a film) and is put on the market. When this camera is assembled, the film is simultaneously loaded in the camera, which makes a user to photograph instantaneously, necessitating neither loading of a film nor rewinding of a film.

In FIGS. 1 and 2, the present one-time use camera 1 is composed of camera main body 11, front cover 12 and rear cover 13, in which the front cover 12 and the rear cover 13 are attached on the camera main body 11 from both sides. On the central portion of the camera main body 11, there is provided photographing frame 14, and on one side out of left and right sides of the photographing frame 14, there is provided cartridge-housing chamber 15 for cartridge P which is a cartridge containing therein a film, and on the other side thereof, there is provided film-roll-housing chamber 16. In the cartridge-housing chamber 15, there is loaded cartridge P, while, in the film-roll-housing chamber 16, there is housed film F wound around spool S, and the film F is taken up by film-winding mechanism 21 into the cartridge P by one frame for each photographing.

A cartridge and a film used in this case are naturally represented by a film cartridge (cartridge) called J 135 stipulated by International Standardization Organization ISO 1007 or 35 mm used in general and a film generally called J 135 or 35 mm, but they may also be represented by another cartridge capable of feeding out the film contained inside from the cartridge by the rotation of a rotary shaft of the cartridge such as those described in Japanese Patent Publication Open to Public Inspection Nos. 126029/1991, 27253/1990 and 179342/1991 (hereinafter referred to as Japanese Patent O.P.I. Publication) and another film such as those described in Japanese Patent O.P.I. Publication No. 219146/1995.

Film-winding mechanism 21 is composed of film-winding knob 22 and other film-winding mechanism parts, and it is arranged to occupy the upper portion of the cartridge-housing chamber 15 and the upper portion of the photographing frame 14. In front of photographing frame 14., there is provided camera lens L. Over the photographing frame 14, there is provided view-finder FD.

On the present one-time use camera, there is provided strobe unit E1. Strobe circuit base board E2 of the strobe unit E1 is fixed on the front side of the film-roll-housing chamber 16. On the strobe circuit base board E2, there is arranged a circuit element, and on the upper portion thereof, there is connected xenon discharge tube E7 which faces opening for strobe flash 23 on front cover 12.

On the lower portion of the strobe circuit base board E2, there is connected main capacitor E4, and battery E5 is connected to the strobe circuit base board E2 through battery contact flake E6. An electric current from the main capacitor E4 charged by the battery E5 causes xenon discharge tube E7 to emit light. Under the opening for strobe flash 23, there is provided strobe switch knob E8 which is operated to turn on the power supply in the case of stroboscopic photographing.

On the one-time use camera 1 arranged in the aforesaid manner, there are described directions for use and instructions, there are formed openings at locations necessary for photographing functions such as an opening for strobe flash, an opening for camera lens, a view-finder aperture, a frame counter opening, and a strobe-charging indication opening as shown in FIG. 1, a design is applied to decorate the exterior, and cover member 19 made of paper is used to cover the one-time use camera 1 to protect it against a shock. Incidentally, a material of the cover member may also be a plastic sheet, without being limited to paper, and even a seal-shaped one which is directly pasted on the main body to be fixed is acceptable.

Next, how a strobe circuit of the strobe unit E1 is structured will be explained, referring to FIG. 3.

Figure 3:
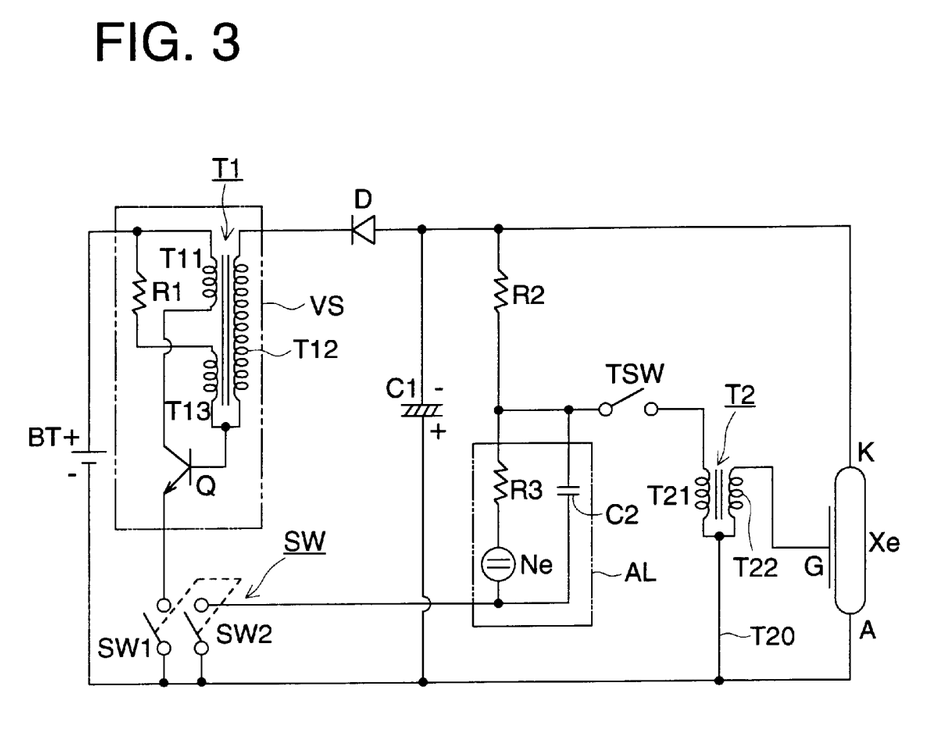
FIG. 3 is a circuit diagram for a strobe in a one-time use camera.

In FIG. 3, BT represents the power supply such as a battery, and the battery BT is connected to boosting circuit VS enclosed with two-dot chain lines through switch element SW1 on one side of strobe switch SW that is interlocked with strobe switch knob E8. The boosting circuit VS is composed of transistor Q, oscillating transformer T1 having therein primary side winding T11, secondary side winding T12 and tertiary side winding, namely feedback winding T13 and resistor R1, and it is supplied with DC current and oscillates to convert DC current into high voltage AC.

The boosting circuit VS is connected to main capacitor C1 which is an electrolytic capacitor through diode D so that AC current supplied from the boosting circuit is rectified by diode D to charge the main capacitor C1. A negative pole (−) and a positive pole (+) of the main capacitor C1 are connected respectively to cathode side terminal K and anode side terminal A both of xenon discharge tube Xe so that an electric current for discharge may be supplied to the xenon discharge tube Xe.

To grid G of the aforesaid xenon discharge tube Xe, there is connected an emission circuit which is connected to the portion between a negative pole and a positive pole of the main capacitor C1 through resistor R2, trigger switch TSW and trigger coil T2 having therein primary side winding T21 and secondary side winding T22. On this emission circuit, when the trigger switch TSW is closed in accordance with shutter operation, a rush current flows to the primary side winding T21 of coil T2 through resistor R2, then, pulse-like voltage generated on the secondary side winding T22 based on the foregoing is given to the grid G of the xenon discharge tube Xe so that the xenon discharge tube Xe emits light.

To the emission circuit mentioned above, there is further connected warning circuit AL which indicates completion of charging and warns failure of switching-off. This warning circuit AL is to be inserted between a mutual contact point between the resistor R2 and the trigger switch TSW and switch element SW2 on the other side of the strobe switch SW, and it has therein a circuit in series for resistor R3 and neon tube Ne and capacitor C2 which is connected in parallel with the circuit in series. This warning circuit AL is connected to the portion between both ends of the main capacitor C1 through resistor R2 when the strobe switch SW is closed, so that the neon tube Ne flashes to indicate completion of charging and to warn failure of switching-off of the strobe switch SW.

Next, operations of the strobe circuit mentioned above will be explained.

First, when the strobe switch SW is closed through an operation of strobe switch knob E8, the boosting circuit VS is connected to battery BT through switch element SW1 on one side of the strobe switch SW. Due to this, the boosting circuit VS is operated to output high voltage AC. This high voltage AC is rectified by diode D to be converted to high voltage DC which is charged in the main capacitor C1. When a release button is pressed, after the main capacitor C1 is fully charged, to operate the shutter so that the trigger switch TSW is closed, the grid G of the xenon discharge tube Xe is subjected to impression of voltage so that the xenon discharge tube Xe may emit light for stroboscopic photographing.

Charges for charging by the main capacitor C1 are supplied to the warning circuit AL through resistors R2 and R3 and switch element SW2 on the other side of the strobe switch SW. ON the warning circuit AL, capacitor C2 is charged by an electric current supplied from the main capacitor C1, and this charging voltage is impressed on a circuit in series for resistor R3 and neon tube Ne, thus, the neon tube Ne starts discharging, namely flashes. Due to the flashing of the neon tube Ne, charging voltage of the capacitor C2 is lowered gradually until the neon tube Ne stops flashing and is turned off when the charging voltage is lowered to a certain level. Due to this, the capacitor C2 is subjected again to charging, and the neon tube Ne discharges again and flashes when the charging voltage is enhanced. In this way, the neon tube Ne blinks. Since this blinking serves as both indication of completion of charging and warning for failure of switching-off of the strobe switch SW, if the strobe switch SW is turned off by moving the strobe switch knob E8 to its off-position after completion of stroboscopic photographing, operations of all circuits including the warning circuit AL are stopped.

Next, examples of the invention will be explained as follows, referring to the strobe circuits in FIGS. 3, 4 and 5 mentioned above, and the invention is not limited to the examples explained below.

Figure 4:
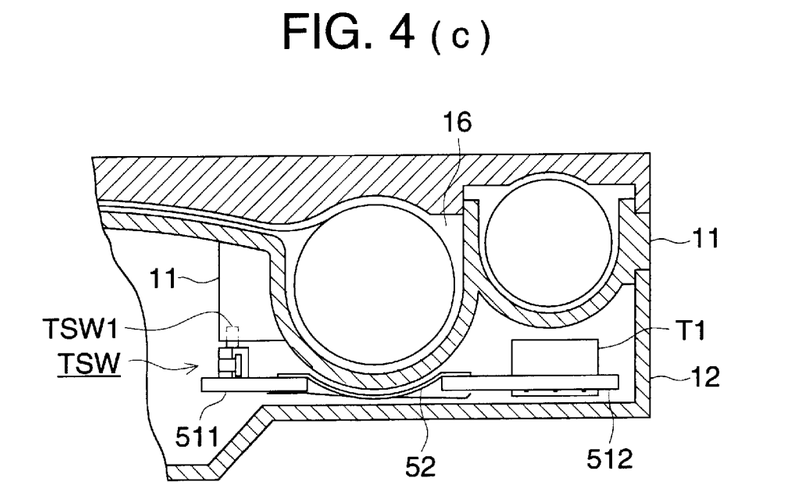
FIG. 4(a) is a front view.
FIG. 4(b) is a left side view.
FIG. 4(c) is a sectional view taken on line X—X in the arrowed direction.
Figure 5:
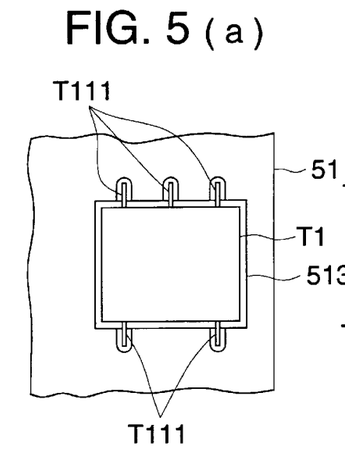
FIGS. 5(a)–5(e) represent diagrams illustrating how an oscillating transformer is attached on a strobe circuit base board of a strobe unit in the invention.

FIG. 4 is a diagram of a strobe unit of the invention, wherein FIG. 4(a) is a front view, FIG. 4(b) is a left side view and FIG. 4(c) is a sectional view taken on line X—X in FIG. 4(a) including a one-time use camera. FIG. 5 represents diagrams each illustrating how an oscillating transformer is attached on a strobe circuit base board of a strobe unit of the invention, wherein FIG. 5(a) is an illustration showing how the oscillating transformer is attached in a square opening, FIG. 5(b) is a longitudinal section of FIG. 5(a), FIG. 5(c) is an illustration showing how the oscillating transformer is attached in a cutout, FIG. 5(d) is an illustration showing how the oscillating transformer equipped with a projected portion of the invention is attached, and FIG. 5(e) is an illustration of a conventional method of attaching the oscillating transformer.

(First example)

A strobe unit incorporated in a one-time use camera of the present example is of the structure wherein each of both sides on the front surface of a film roll chamber of the one-time use camera is provided with a strobe circuit base board.

Namely, in FIG. 4, two strobe circuit base boards 511 and 512 are arranged on both sides on the front surface of film roll chamber 16 as shown in the drawing, and these two strobe circuit base boards 511 and 512 are connected and fixed as shown in the drawing by two connecting plates 52 which represent sheet metal members. Each of these connecting plates 52 connecting these strobe circuit base boards 511 and 512 is a steel sheet such as a thin stainless steel sheet, for example, and it is formed to follow along the front surface of the film roll chamber 16 as illustrated, and that following portion is engaged with the front surface of the film roll chamber 16 as illustrated. Accordingly, the thickness of the one-time use camera can be made thinner mostly by at least the thickness of the strobe circuit base board.

When strobe circuit base boards 511 and 512 are attached relatively firmly on strobe flashing portion 231 where xenon discharge tube Xe on the upper part of strobe unit 50 is housed, only one connecting plate 52 at the lower side is also enough. Or, on the contrary, two or more connecting plates are also acceptable.

It is preferable that at least one of these connecting plates 52 serves also to connect the strobe circuit base boards 511 and 512 electrically. When a metallic plate which is relatively wide and has great current capacity is used for the connecting plate, it is preferable that it is used as a conducting path (lowermost line of strobe circuit diagram in FIG. 3) running from a negative side terminal of battery BT to anode side terminal A of xenon discharge tube Xe, which is a 0 V line in the strobe circuit diagram in FIG. 3.

It is also preferable that the connecting plate 52 is used, in the same way, as a line through which the electric current boosted by oscillating transformer T1 flows to the negative side terminal of main capacitor C1, namely as a conducting path extending from a negative pole (−) of main capacitor C1 to cathode side terminal K of xenon discharge tube Xe.

It is also acceptable that the connecting plate 52 is used, in the same way, as a conducting path for connecting and fixing to anode side terminal A of xenon discharge tube Xe, in a manner that the anode side terminal A is connected and fixed to branch portion 521 branching upward from the central portion of the upper connecting plate 52 in FIG. 4(a). In this case, however, the connecting plate 52 is naturally a conducting path of the above-mentioned 0 V line.

It is also acceptable that the connecting plate 52 is used, in the same way, as a conducting path for connecting and fixing to cathode side terminal K of xenon discharge tube Xe, in a manner that the cathode side terminal K is connected and fixed to the branch portion 521 in the same manner as in the foregoing, by turning the xenon discharge tube Xe the other way from left to right. In this case, however, the connecting plate 52 is naturally a conducting path extending from the negative pole (−) of the main capacitor C1 mentioned above.

By using the connecting plate 52 as a conducting path as described above, it is possible to make an area of strobe circuit base board 51 small, and total area of strobe circuit base boards 511 and 512 is smaller than the area of a single conventional strobe circuit base board, which makes it possible to reduce cost.

Incidentally, the strobe circuit base board 511 can be connected to the strobe circuit base board 512 not only by the connecting plate but also by a flexible base board or by a lead wire. However, when the connecting plate is used for connecting two circuit base boards, the two circuit base boards can keep the form that they are fixed and unified solidly, which makes it easy to handle them in assembly process. In addition, the unified circuit base boards can be easily taken out of the camera main body, and they can be easily mounted again to the camera main body in a reuse program. It is therefore preferable that a connecting plate is used for connecting the strobe circuit base board 511 to the strobe circuit base board 512.

(Second example)

A strobe unit incorporated in a one-time use camera of the present example may be of the structure wherein two strobe circuit base boards are connected and fixed by one or plural sheet metal members.

In this case, when there is a projected portion on the strobe circuit base board side inside front cover 12, it is possible to avoid the projected portion by connecting and fixing two strobe circuit base boards with a flat connecting plate.

(Third example)

A strobe unit incorporated in a one-time use camera of the present example is of the structure wherein an oscillating transformer whose terminals are arranged in the direction that is in parallel with a strobe circuit base board is implanted fixed in an opening that is provided on the strobe circuit base board to be larger than the oscillating transformer.

Namely, in FIGS. 5(a), 5(b) and 5(c), terminals T111 of the oscillating transformer T1 are arranged on the oscillating transformer T1 to be in parallel with strobe circuit base board 51 as illustrated in the present example, and the oscillating transformer T1 is put in opening 513 or cutout 514 provided on the strobe circuit base board 51 to be larger than the oscillating transformer T1 so that the terminals T111 are engaged with the strobe circuit base board 51. Then, the terminals T111 are soldered to be fixed on an unillustrated circuit pattern facing the terminals T111 of the strobe circuit base board 51.

A total thickness of the oscillating transformer T1 portion in this case is t1. FIG. 5(e) shows how a conventional oscillating transformer is attached, and it is understood from the drawing that the oscillating transformer T1 having on its bottom side the terminals T111 is attached on the strobe circuit base board 51 in a manner that the terminals T111 are projected from an opening provided on the strobe circuit base board 51 as illustrated. Then, the terminals T111 projected from the strobe circuit base board 51 are soldered on the circuit pattern provided there. A total thickness of the oscillating transformer T1 portion in this case is t2.

Namely, the thickness t1 represents only the thickness of the oscillating transformer T1, while the thickness t2 represents the total thickness including the thickness of the oscillating transformer T1, the thickness of the strobe circuit base board 51 and the thickness of the projection of the terminals T111 projected from the strobe circuit base board 51. In particular, an amount of projection of the terminals T111 projected from the strobe circuit base board 51 is unstable, and it varies the thickness t2 greatly.

In the case of the present example, terminals T111 were extended from oscillating transformer T1 to be within its thickness and to be in parallel with strobe circuit base board 51, and the oscillating transformer T1 was put in an opening which was provided on the strobe circuit base board 51 to be larger than the oscillating transformer T1. Therefore, the total thickness was represented only by the thickness of the oscillating transformer T1 which was very thin.

FIG. 5(d) shows an arrangement wherein projected portion T112 is provided on the side of oscillating transformer T1, and the oscillating transformer T1 is attached to strobe circuit base board 51 through this projected portion T112 which fixes a position in the perpendicular direction of the strobe circuit base board 51 for the strobe circuit base board 51. Terminals T111 of the oscillating transformer T1 are arranged to be in parallel with the strobe circuit base board 51, and between the terminals T111 and the edge of the opening on the strobe circuit base board 51, there is provided clearance C caused by the projected portion T112 of the oscillating transformer T1.

Due to the arrangement mentioned above, even if an external force is applied on the oscillating transformer T1 from its projected portion T112 side, no external force is applied on the terminals T111, resulting in no troubles including the snapping of a wire in the terminals. It is therefore preferable that an oscillating transformer is positioned so that its projected portion T112 side is on the front cover 12 side as shown in FIG. 4(c). Further, a thickness of the oscillating transformer portion is represented by the thickness of the oscillating transformer T1 alone, which is the same as the foregoing mentioned above. This clearance C is preferably 1 mm or less.

(Fourth example)

A strobe unit incorporated in a one-time use camera of the present example is of the structure wherein a projected portion is provided on a trigger switch of a strobe circuit and a recessed portion is provided on the one-time use camera main body or the front cover thereof facing the trigger switch, so that the projected portion may be engaged with the recessed portion when the one-time use camera is assembled.

Namely, in FIGS. 4(a) through 4(c) again, trigger switch TSW of strobe circuit is provided, as illustrated, with positioning pin TSW1 representing a projected portion on the side of the trigger switch that is opposite to strobe circuit base board 511 on which the trigger switch TSW is attached, in the present example. On the unit main body 11 on the main body side facing the trigger switch TSW, there is provided a hole serving as a recessed portion to be engaged with the positioning pin TSW1 representing a projected portion, in the present example, so that the positioning pin TSW1 of the trigger switch TSW may be engaged with the above-mentioned hole when a one-time use camera is assembled. Owing to this arrangement, the trigger switch TSW can be positioned at a prescribed location on the unit main body 11.

The trigger switch TSW is represented by a switch wherein movable contact flake TSW2 is brought into contact with fixed contact flake TSW3 for continuity so that an emission of light by the strobe is executed when contact flake tip TSW4 at the tip of the movable contact flake TSW2 is hit by an unillustrated shutter driving member provided on the unit main body. Therefore, when a relative position between the trigger switch TSW and the shutter driving member which operates the trigger switch TSW is stabilized at the prescribed position, the switch-on timing for the trigger switch TSW and a shutter speed are stabilized, and dispersion thereof is small to produce smooth production, resulting in an effect of cost reduction.

Owing to the present invention, cost reduction and miniaturization of a strobe unit have been made possible, resulting in offering of an inexpensive and small-sized one-time use camera to users.

What is claimed is:

1. A one-time use camera comprising
   a main body including a photographing unit, a front cover, and a strobe unit;
   said strobe unit comprising at least one strobe circuit baseboard having a front surface, facing said front cover, and a back surface, facing away from said front cover;
   a trigger switch having a first engaging portion, said main body having a second engaging portion, said trigger switch on said back surface, said first portion and said second portion engaging each other.

2. The one-time use camera of claim 1 further comprising
   a film roll chamber adapted to receive a photographic film, said strobe unit including
   (a) a first strobe circuit baseboard on one side of a front surface of said film roll chamber; and
   (b) a second strobe circuit baseboard on another side of said film roll chamber.

3. The one-time use camera of claim 2 further comprising
   an oscillating transformer having terminals arranged in a direction parallel to one of said first strobe circuit baseboard and said second strobe circuit baseboard;
   wherein said oscillating transformer is implanted in an opening in said first strobe circuit baseboard portion or said second circuit baseboard portion, said opening being larger than said oscillating transformer.

4. The one time use camera of claim 2 further comprising a connecting means for electrically connecting said first strobe circuit baseboard with said second strobe baseboard.

5. The one-time use camera of claim 2, wherein said connecting means is at least one sheet metal member, and said first strobe circuit base board and said second strobe circuit base board are fixedly connected to each other by said at least one sheet metal member.

6. The one-time use camera of claim 5, wherein said connecting means is a plurality of sheet metal members and at least one of said plurality of sheet metal members electrically connects said first strobe circuit base board with said second strobe circuit base board.

7. The one-time use camera of claim 6, wherein said at least one of said plurality of sheet metal members, which electrically connects said first strobe circuit base board with said second strobe circuit base board, is a 0 V line of a strobe circuit of said strobe unit.

8. The one-time use camera of claim 6, wherein said at least one of said plurality of sheet metal members, which electrically connects said first strobe circuit base board with said second strobe circuit base board, is a line to flow electric current, which is boosted by an oscillating transformer of said strobe circuit, to a negative side terminal of a main capacitor of said strobe circuit.

9. The one-time use camera of claim 6, wherein said at least one of said plurality of sheet metal members, which electrically connects said first strobe circuit base board with said second strobe circuit base board, is fixedly connected to an anode side terminal of the xenon discharge tube.

10. The one-time use camera of claim 6, wherein said at least one of said plurality of sheet metal members, which electrically connects said first strobe circuit base board with said second strobe circuit base board, is fixedly connected to a cathode side terminal of the xenon discharge tube.

11. The one-time use camera of claim 3, wherein said oscillating transformer has a projected portion for attaching said oscillating transformer to one of said first strobe circuit base board and said second strobe circuit base board so that a position of said oscillating transformer, in a perpendicular direction to said one of said first strobe circuit base board and said second strobe circuit base board, is fixed.

12. The one-time use camera of claim 11, wherein said oscillating transformer is placed on one of said first strobe circuit base board and said second strobe circuit base board so that said terminals are arranged parallel to one of said first strobe circuit base board and said second strobe circuit base board and said projected portion creates a gap between said oscillating transformer and an edge of said opening provided in one of said first strobe circuit base board and said second strobe circuit base board.

13. The one-time use camera of claim 12, wherein said gap, between said oscillating transformer and said edge of said opening provided in one of said first strobe circuit base board and said second strobe circuit baseboard, is not more than 1 mm.

* * * * *